United States Patent
Romanowski et al.

(10) Patent No.: US 7,397,857 B2
(45) Date of Patent: Jul. 8, 2008

(54) METHOD FOR TRANSFORMATION-CODING FULL MOTION IMAGE SEQUENCES

(75) Inventors: Alexander Romanowski, Hildesheim (DE); Sven Bauer, Hildesheim (DE); Peter Siepen, Oberhausen (DE); Mathias Wien, Aachen (DE); Thomas Wedi, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 695 days.

(21) Appl. No.: 10/275,603

(22) PCT Filed: Mar. 16, 2001

(86) PCT No.: PCT/DE01/01018

§ 371 (c)(1),
(2), (4) Date: Oct. 7, 2003

(87) PCT Pub. No.: WO01/86961

PCT Pub. Date: Nov. 15, 2001

(65) Prior Publication Data

US 2004/0062309 A1  Apr. 1, 2004

(30) Foreign Application Priority Data

May 10, 2000 (DE) .................. 100 22 331

(51) Int. Cl.
H04N 7/12 (2006.01)
H04N 11/02 (2006.01)

(52) U.S. Cl. .............. 375/240.16; 375/240.24; 375/240.18

(58) Field of Classification Search .......... 375/240.18, 375/240.2, 240.24
See application file for complete search history.

(56) References Cited

U.S. PATENT DOCUMENTS

| | | | |
|---|---|---|---|
| 5,021,891 A * | 6/1991 | Lee | 382/250 |
| 5,107,345 A | 4/1992 | Lee | |
| 5,576,767 A * | 11/1996 | Lee et al. | 375/240.14 |
| 5,724,451 A * | 3/1998 | Shin et al. | 382/240 |
| 5,784,107 A | 7/1998 | Takahashi | |
| 6,427,028 B1 * | 7/2002 | Donescu et al. | 382/243 |
| 6,600,836 B1 * | 7/2003 | Thyagarajan et al. | 382/239 |

FOREIGN PATENT DOCUMENTS

EP  0 536 784 A  4/1993

OTHER PUBLICATIONS

Cham et al., 'An Order-16 Integer Cosine Transform', May 1991, IEEE Transactions on Signal Processing, vol. 39, No. 5, pp. 1205-1208.*

(Continued)

*Primary Examiner*—Gims S. Philippe
*Assistant Examiner*—Erick Rekstad
(74) *Attorney, Agent, or Firm*—Michael J. Striker

(57) ABSTRACT

In the case of a method for transformation encoding of moving-image sequences, motion vectors are estimated block-by-block, with which said motion vectors a motion compensation is carried out. The prediction error is transformation-encoded. According to the invention, the block size of the transformation encoding is coupled to the block size used in each case for the motion compensation. This measure makes it possible to enhance the efficiency of the encoding of the prediction error in hybrid encoding procedures that use various block sizes.

8 Claims, 1 Drawing Sheet

OTHER PUBLICATIONS

Telecom. Standardization Sector of ITU: "Video Coding for Low Bitrate Communications", H. 263, Version 2, Sep. 1997, pp. 1-150.

J.-R. Ohm: "Digitale Bildcodierung", Berlin, Heidelberg-New York, Springer Verlag 1995, pp. 434-436.

Puri A. et al: "Interframe Coding with Variable Block-Size Motion Compensation" Globecom Tokyo'87. IEEE/IECE Global Telecommunications Conference 1987. Conference Record (Cat. No. 87CH2520-5), Tokyo, Japan Nov. 15-18, 1987, pp. 65-69, vol. 1, XP001014721 1987.

Carpentieri B et al: : Split-Merge Video . . . Proceedings of the IEEE, IEEE New York, US, BD. 82, NR. 6, Jun. 1, 1994, pp. 940-947.

ISO/IEC JTCI IS 14496-2 (MPEG-4). "Information Technology—Generic Coding . . . ", Oct. 1998.

Telecom. Standardization Sector of ITU, "H26L Test Model Long Term 3," In Study Group 16, Question 15, Meeting J, Osaka, Japan, ITU, Mar. 2000.

T.D Tran, "Fast Multilierless Approximation of the DCT", In 99-RD Annual Conference on Information Science and Systems, Baltimore, MD, USA, Mar. 1999.

* cited by examiner

METHOD FOR TRANSFORMATION-CODING FULL MOTION IMAGE SEQUENCES

CROSS-REFERENCE

The invention described and claimed hereinbelow is also described in PCT/DE 01/01018, filed on Mar. 16, 2001 and DE 10022 331.1, filed May 10, 2000. This German Patent Application, whose subject matter is incorporated here by reference, provides the basis for a claim of priority of invention under 35 U.S.C. 119 (a)-(d).

BACKGROUND OF THE INVENTION

The invention is based on a method for transformation encoding of moving-image sequences, in the case of which motion vectors are estimated block-by-block between a reference image signal and an actual image signal from the image sequence, with which said motion vectors the motion compensation is carried out.

In the case of hybrid encoding concepts for encoding moving-image sequences, a motion vector field is estimated block-by-block between a previously-generated image signal (reference frame) and an actual frame from an image sequence. This vector field is then used to perform a motion compensation. The motion vector field and the residual prediction error are encoded and transmitted to the receiver. The prediction error is usually encoded using block transformations, typically a discrete cosine transformation (DCT) with 8×8 coefficients.

An 8×8 DCT is used for transformation encoding in the previously standardized methods for moving-image encoding [1, 2]. For the motion compensation, blocks that are 16×16 and 8×8 pixels in size are used and, with MPEG-4, 16×8 pixels [1] are also used in the case of interlaced coding. The size of the block transformation is constant with 8×8 coefficients.

In the test model for the new H.26L video coding standard [3], a 4×4 integer transformation based on the DCT is proposed. Compared to the DCT, this has the advantage that the pixel values—present in the form of integers—are mapped on integer transformation coefficients. This makes perfect reconstruction possible on the one hand and, on the other, it eliminates the transformation errors that are possible with the heretofore-common float-DCT, which said errors occur when the inverse DCTs are implemented differently in the transmitter and the receiver, e.g., when the float data type is used on one side and the double data type is used on the other side. An integer transformation is presented in [4] that approximates the transformation properties of the DCT and can be used in place of the float DCT.

In the H.26L test model, block sizes of 16×16 to 4×4 pixels are used for motion compensation. They are divided into 4×4 blocks in the test model for transformation encoding.

ADVANTAGES OF THE INVENTION

With the measures described in claim 1 and the further developments of the dependent claims, the efficiency of encoding of the prediction error can be enhanced, in particular in hybrid encoding procedures when different block sizes are used in the motion compensation.

The method according to the invention, i.e., coupling the block size of the transformation for the prediction error to the block size used in the motion compensation, is advantageous in particular when the blocks to be transformed are not limited to square shapes, and rectangular blocks are permitted as well, e.g., 4×8 or 16×8 pixels.

Compared to the conventional methods, the use of block sizes coupled to the motion compensation offers the advantage that maximally-large parts of the prediction error can be transformed jointly without block boundaries contained therein diminishing the transformation gain with disturbing, high-frequency parts (blocking artifacts). Enhanced encoding efficiency is achieved as a result. The transformation of large blocks (16×16) and blocks having a non-square shape, e.g., 8×4 or 16×8 pixels, results in encoding gains compared to known methods. As a result of the transformation, the energy of the transformed signal is concentrated on a few coefficients. The number of successive zeros within blocks is increased by the use of larger blocks, which can be used to make encoding more efficient (run-length encoding).

Since the selection of block sizes is already encoded in the bitstream for the motion compensation, no further signalization is needed to use the adapted transformations.

SUMMARY OF THE DRAWINGS

Exemplary embodiments of the invention are described in greater detail with reference to the drawings.

DESCRIPTION OF THE PREFERRED EMBODIMENTS

Figure 1:
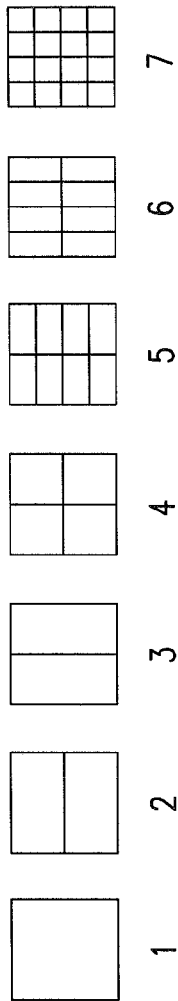
FIG. 1 shows a possible division of a macroblock into sub-blocks.

In the standardized coding method and in H.26L, the image-sequence frames are divided into macroblocks (MB) that are composed of a block with 16×16 pixels of luminance components and two chrominance blocks corresponding therewith, often 8×8 pixels, 4:2:0 YUV format [5]. Only the luminance components shall be considered hereinbelow; they are referred to as MB. The possible divisions of a macroblock MB proposed for H.26L are presented in FIG. 1. The first block represents a macroblock with 16×16 pixels, while the macroblock with the smallest subdivisions has 4×4 sub-blocks.

In the case of the invention, the motion vectors are estimated block-by-block between an actual reference image signal—in particular a previously transmitted or determined image signal—and an actual image signal of a moving-image sequence, with which said motion vectors the motion compensation is carried out. Different block sizes are used. The prediction error is transformation-encoded. The block size of the transformation encoding is coupled to the block size used in the motion compensation, in particular, the block size selected for the transformation encoding is the same as the block size that was used in the motion compensation. Square as well as rectangular blocks are permitted so that maximally-large parts of the prediction error can be transformed jointly. This results in very efficient encoding, since the block sizes for the motion compensation are to be already encoded in the transmission bitstream, and further signalization is therefore not required for the adaptive transformation encoding with regard for its block sizes.

The number of successive zeroes within the blocks can be used for efficient encoding, in particular run-length encoding.

Figure 2:
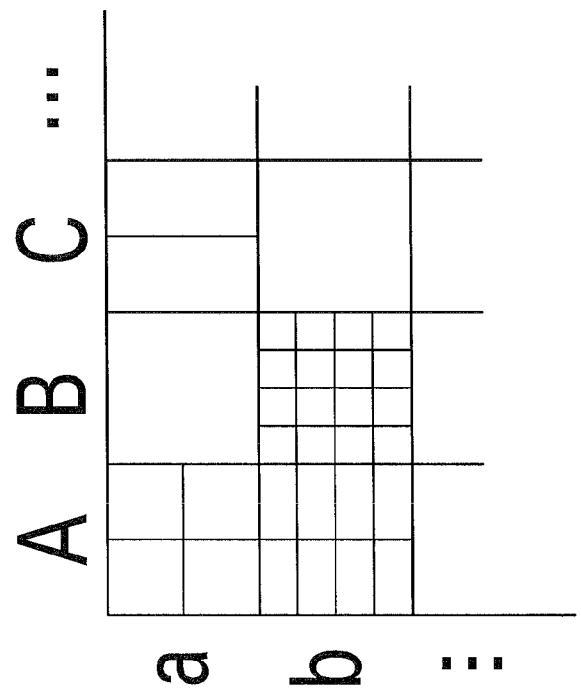
FIG. 2 shows an adaptive block subdivision of a macroblock.

FIG. 2 shows a few macroblocks MB with 16×16 pixels in the upper left-hand corner of a frame. The macroblocks MB are labelled here with lower-case letters for the rows and upper-case letters for the columns. Example: the first macroblock MB in the second row is referred to as MB (bA).

The subdivision of the macroblocks that were determined for the motion compensation is shown. In other words, macroblock MB (aA) is divided into four sub-blocks, to each of which a motion vector is assigned. Each of these sub-blocks is predicted independently of the other ones from the reference frame. MB (aB) has only one motion vector; in this case, the sub-block therefore corresponds to the entire macroblock MB. In the example MB (bA), there are eight sub-blocks that are predicted independently of each other with their own motion vectors. The prediction error that remains with the motion compensation also has the block structure shown.

For the transformations with adaptive block size, the information known from the motion compensation about the subdivision of the macroblocks is referred to. For each macroblock MB, that block transformation is selected that has the same block size as the sub-blocks. Therefore: in macroblock MB (aA), each of the four sub-blocks is transformed with an 8×8 transformation. Macroblock MB (aB) is given a 16×16 transformation, macroblock MB (aC) is given 8×16 transformations, etc. The block size of the transformations therefore corresponds to the block size of the motion compensation (size of the sub-blocks).

Square Blocks

Separable transformations are used, i.e., the transformation matrix is applied in the horizontal and vertical direction, i.e., in the case of a square, $$C = T \times B \times T^T$$

Wherein B represents a block with n×n pixels, and C represents the transformed block, T is the transformation matrix having the size n×n. This is orthogonal, i.e., $$T \times T^T = T^T \times T = \text{constant} \times I_n,$$

Whereby $I_n$ refers to the n×n unit matrix. The following applies for orthonormal transformations: $T \times T^T = I$, i.e., constant=1.

Rectangular Blocks

Separable orthogonal transformations are also used with rectangular blocks having the size n×m, with n≠m. The transformation matrices for the rows and columns have different sizes, which is characterized by the indexing in the following equation:

$$C_{n,m} = T_{v\,m,n} \times B_{n,m} \times T^T_{h\,n,n}$$

$T_h$ represents the transformation matrix for the rows, and $T_v$ represents the transformation matrix for the columns.

Quantization

Scalar quantization is used as the basis hereinbelow. The following relationships must be modified accordingly for other quantifiers.

The blocks of the prediction error are transformed. If orthonormal transformation matrices are used, i.e., $T \times T^T = I$, a scalar quantization with a constant quantization step size $q_P$ for all transformation block sizes results in the same measure of distortion.

When whole-number, i.e., integer transformations, are applied in particular, it must be assumed that the transformation matrices are non-standardized. In this case, a generally-valid quantization step size cannot be given. Since a uniform distortion is generally desired in all blocks of the encoded frame, quantifier tables must be compiled in which a corresponding $q_{Pi}$ is assigned to a $q_p$ specified for encoding for every block form that occurs.

If $c_h$ and $c_v$ are the scaling constants of the transformation matrices in the horizontal and vertical direction, $$T_h \times T^T_h = c_h \times I_n,$$

$$T_v \times T^T_v = c_v \times I_m;$$

whereby $T_h$ is an n×n matrix, and $T_v$ is an m×m matrix. The quantifier step size for the n×m block $B_i$ can then be determined using this equation:

$$q_{Pi} = \frac{1}{\sqrt{c_n}\sqrt{c_v}} q_P$$

In the case of whole-number transformations—integer transformations—$q_{P,i}$ should be an integer. An allocation table that contains the integer $q_{Pi}$ adapted accordingly for each block size must be compiled for this purpose.

A typical feature of the invention is the fact that basic functions or basic images of the underlying transformations become visible in the case of a very coarse quantization in the reconstructed frames. In the case of the conventional encoding methods, the block size of these basic functions is constant in the entire frame; when the adaptive block sizes are used, basic images having different sizes and, mainly, non-square shapes, in accordance with the blocks of the motion compensation, can be made out.

REFERENCES

[1] ISO/IEC JTC1 IS 14496-2 (MPEG-4). "Information technology—generic coding of audio-visual objects (final draft of international standard," October 1998.

[2] Telecom. Standardization Sector of ITU, "Video coding for low bitrate communication (H.263 Version 2)," September 1997.

[3] Telecom. Standardization Sector of ITU, "H.26L test model long term 3," in Study Group 16, Question 15, Meeting J, (Osaka, Japan), ITU, March 2000

[4] T. D. Tran, "Fast multiplierless approximation of the DCT," in 99rd Annual Conference on Information Science and Systems, (Baltimore, Md., USA), March 1999

[5] J.-R. Ohm, Digitale Bildcodierung. Berlin, Heidelberg, N.Y: Springer-Verlag, 1995

What is claimed is:

1. A method for transformation encoding of moving-image sequences, comprising the following steps:

estimating motion vectors block-by-block between a reference image signal and an actual image signal from the image sequence, with which said motion vector compensation is carried out, wherein individual frames of the moving image sequence are divided into macroblocks, whereby for each macroblock the block size of a macroblock, square sub-blocks of a macroblock, or rectangle sub-blocks of a macroblock are adaptively used for motion compensation, and transformation-encoding the residual prediction error with the following measure:

the block size of the transformation encoding is coupled to the block size used in each case for the motion compensation, whereby a maximum portion of the prediction error is commonly transformed, wherein the block transformation is selected for each macroblock that has the same block size as the block size used for the motion compensation.

2. The method according to claim 1, wherein, for the transformation encoding, separable transformations are used for square as well as rectangular blocks.

3. The method according to claim 1, wherein integer coefficients are used for the transformation encoding.

4. The method according to claim 1, wherein orthonormal transformation matrices with scalar quantization are used for the transformation encoding.

5. The method according to claim 1, wherein the quantization step size for the transformation encoding is specified in such a manner that the same measure of distortion—caused in particular by the quantization—occurs in all transformation blocks.

6. The method according to claim 3, wherein, for the transformation encoding with integer coefficients, an allocation is carried out—in particular in the form of an allocation table—that specifies the integer quantization step size ($q_{Pi}$) adapted accordingly for each block size.

7. The method according to claim 1, wherein a separate signalization is not carried out between encoder and decoder to provide information about the block size used in each case when transformation encoding is carried out, but wherein instead, the encoding of the block sizes in conjunction with the motion compensation is referred to.

8. The method according to claim 1, wherein run-length encoding is used for encoding.

* * * * *